US012693920B1

(12) United States Patent
Qin et al.

(10) Patent No.: US 12,693,920 B1
(45) Date of Patent: Jul. 28, 2026

(54) METHOD FOR MONITORING A NONLINEAR DYNAMIC PROCESS AND A COMPUTING SYSTEM

(71) Applicants:Lingnan University, Hong Kong (CN); City University of Hong Kong, Hong Kong (CN)

(72) Inventors: Si-Zhao Qin, Hong Kong (CN); Yining Dong, Hong Kong (CN); Jiaxin Yu, Hong Kong (CN)

(73) Assignees: Lingnan University, Hong Kong (CN); City University of Hong Kong, Hong Kong (CN)

( * ) Notice: Subject to any disclaimer, the term of this patent is extended or adjusted under 35 U.S.C. 154(b) by 12 days.

(21) Appl. No.: 19/038,791

(22) Filed: Jan. 28, 2025

(51) Int. Cl.
*G06F 11/00* (2006.01)

(52) U.S. Cl.
CPC ...... *G06F 11/006* (2013.01); *G06F 2201/805* (2013.01)

(58) Field of Classification Search
CPC .................................................... G06F 11/006
See application file for complete search history.

(56) References Cited

U.S. PATENT DOCUMENTS 6,453,308 B1 * 9/2002 Zhao ...................... G05B 17/02
702/24

FOREIGN PATENT DOCUMENTS

| CN | 108960329 A | 12/2018 |
|---|---|---|
| CN | 116738866 A | 9/2023 |
| CN | 118897956 A | 11/2024 |

OTHER PUBLICATIONS

W. Ku, R. Storer, and C. Georgakis, "Disturbance detection and isolation by dynamic principal component analysis," Chemometrics Intell. Lab. Systems, vol. 30, p. 179, 1995.

J. H. Cho, J. M. Lee, S. W. Choi, D. Lee, and I. B. Lee, "Fault identification for process monitoring using kernel principal component analysis," Chem. Eng. Sci., vol. 60, pp. 279-288, 2005.

S. W. Choi and I.-B. Lee, "Nonlinear dynamic process monitoring based on dynamic kernel pca," Chemical engineering science, vol. 59, No. 24, pp. 5897-5908, 2004.

K. E. S. Pilario, Y. Cao, and M. Shafiee, "A kernel design approach to improve kernel subspace identification," IEEE Transactions on Industrial Electronics, vol. 68, No. 7, pp. 6171-6180, 2020.

International Search Report of International Application No. PCT/CN2026/071704 Issued from the Patent Cooperation Treaty on Apr. 14, 2026.

* cited by examiner

*Primary Examiner* — Amine Riad
(74) *Attorney, Agent, or Firm* — S&F/WEHRW

(57) ABSTRACT

A method for monitoring a nonlinear dynamic process and a computing system are provided. The method includes training a model based on sample data, wherein the model comprises: a first layer, wherein the first layer is configured to linearize the sample data using one or more dimension lifting techniques; a second layer, wherein the second layer is configured to extract reduced-dimension dynamic latent variables (DLVs) from the linearized sample data using a reduced-dimension model; and a third layer, wherein the third layer is configured to parameterize the extracted reduced-dimension DLVs using a latent state space model; and inputting data from the nonlinear dynamic process into the trained model for monitoring the nonlinear dynamic process.

18 Claims, 8 Drawing Sheets

102 training a model based on sample data

104 inputting data from the nonlinear dynamic
process into the trained model

Communication path 826

METHOD FOR MONITORING A NONLINEAR DYNAMIC PROCESS AND A COMPUTING SYSTEM

TECHNICAL FIELD

The present specification relates broadly, but not exclusively, to a method for monitoring a nonlinear dynamic process and to a computing system.

BACKGROUND

Monitoring of industrial processes is important for industrial process systems. Industrial process monitoring typically rely on linear modeling techniques such as principal component analysis (PCA) and canonical correlation analysis (CCA) for modeling and predicting system behaviors. Objectives of industrial process monitoring may include detecting status of an operation condition and locating faulty system units, which may include fault detection to detect and/or determine whether faults have occurred in the process systems, and fault identification to identify relevant process variables responsible for the detected faults. Traditional modeling techniques have limitations in handling collinear variables and extracting predictable and intrinsic dynamics in a unified manner In industrial settings, process data can be collinear due to relatively complex relationships between material and energy. Typically, dimension reduction methods are adopted to handle the collinearity of process variables in industrial process monitoring. For example, existing methods like principal component analysis (PCA) and canonical variate analysis (CVA) are utilized to extract latent variables to simplify monitoring and interpretation in process modeling. However, these linear approaches may fail to accurately capture nonlinear dynamic relationships inherent in modern industrial systems.

Nonlinear modeling methods such as kernel PCA (KPCA), kernel dynamic PCA (KDPCA), and kernel CVA (KCVA) can be incorporated into process monitoring methods. For example, kernel method may first be used for process modeling. Thereafter, latent variables can be extracted. Finally, corresponding monitoring indices can be computed with a kernel trick. However, these methods have limitations such as large model parameter scales and non-predictable latent variables, which can compromise fault detection and fault identification performances.

A need therefore exists to improve the manner in which a nonlinear dynamic process can be monitored.

SUMMARY

According to a first aspect, there is provided a method for monitoring a nonlinear dynamic process, comprising: training a model based on sample data, wherein the model comprises: a first layer, wherein the first layer is configured to linearize the sample data using one or more dimension lifting techniques; a second layer, wherein the second layer is configured to extract reduced-dimension dynamic latent variables (DLVs) from the linearized sample data using a reduced-dimension model; and a third layer, wherein the third layer is configured to parameterize the extracted reduced-dimension DLVs using a latent state space model; and inputting data from the nonlinear dynamic process into the trained model for monitoring the nonlinear dynamic process.

According to a second aspect, there is provided a computing system, comprising: at least one processor; a non-transitory computer-readable storage medium coupled to the at least one processor and storing programming instructions for execution by the at least one processor, the programming instructions instruct the at least one processor to: train a model based on sample data, wherein the model comprises: a first layer, wherein the first layer is configured to linearize the sample data using one or more dimension lifting techniques; a second layer, wherein the second layer is configured to extract reduced-dimension dynamic latent variables (DLVs) from the linearized sample data using a reduced-dimension model; and a third layer, wherein the third layer is configured to parameterize the extracted reduced-dimension DLVs using a latent state space model; and input data from the nonlinear dynamic process into the trained model for monitoring the nonlinear dynamic process.

BRIEF DESCRIPTION OF THE DRAWINGS

Embodiments are provided by way of example only, and will be better understood and readily apparent to one of ordinary skill in the art from the following written description, read in conjunction with the drawings, in which.

Figure 1:
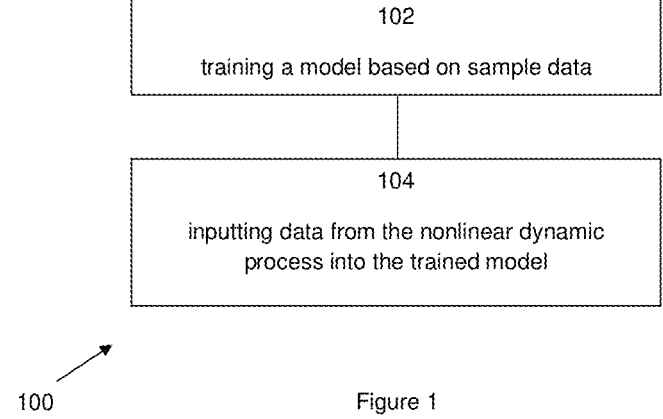
FIG. 1 is a flow chart illustrating an example of a method for monitoring a nonlinear dynamic process, according to an embodiment.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a conventional computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM, GPRS, 3G or 4G mobile telephone systems, as well as other wireless systems such as Bluetooth, ZigBee, Wi-Fi. The computer program when loaded and executed on such a computer effectively results in an apparatus that implements the steps of the preferred method.

The present invention may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC) or Field Programmable Gate Array (FPGA). Numerous other possibilities exist. Those skilled in the art will appreciate that the system can also be implemented as a combination of hardware and software modules.

This specification uses the term "configured to" in connection with systems, apparatus, and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

As mentioned above, monitoring of industrial processes is important for industrial process systems. However, typical methods have limitations which can compromise fault detection and fault identification performances. Industrial processes are typically characterized by their inherent nonlinearities and complexity of interactions between numerous process variables. Despite these complexities, actual dynamics driving such process systems are often low-dimensional latent states.

Embodiments described in the present specification may involve a kernel latent state space (KLaSS) model having a layered architecture to handle nonlinearity, and to extract predictable dynamic latent variables (DLVs) and intrinsic states variables. The layered architecture may comprise an outer layer, a DLVs layer and a states layer.

The outer layer may utilize kernel methods to manage non-linearities in process data by lifting the data into a high-dimensional feature space. Advantageously, this transformation allows the system to linearize complex relationships, making them more manageable for afterwards analysis.

The DLVs layer may be configured to extract predictable DLVs that optimize the predictive performance of the model. Beneficially, the DLVs layer minimizes prediction errors and allows the latent variables selected to be those most relevant for accurate predictions.

The states layer may be the innermost layer and may use a latent state space model to encapsulate intrinsic dynamics within the system by utilizing compact system matrices that reduce parameterization complexity. Beneficially, the states layer effectively captures and models long-term temporal dependencies in the system.

Using the KLaSS model, process monitoring strategies of fault detection and fault identification can be built based on the extracted DLVs and information between fault labels and DLVs, respectively. These strategies improve monitoring and diagnostic accuracies, hence enables more precise and timely identification of process anomalies.

FIG. 1 is a flow chart 100 illustrating an example of a method for monitoring a nonlinear dynamic process, according to an embodiment. At step 102, a model based on sample data is trained. The model comprises a first layer. The first layer is configured to linearize the sample data using one or more dimension lifting techniques. The model further comprises a second layer. The second layer is configured to extract reduced-dimension dynamic latent variables (DLVs) from the linearized sample data using a reduced-dimension model. The model further comprises a third layer. The third layer is configured to parameterize the extracted reduced-dimension DLVs using a latent state space model. At step 104, data from the nonlinear dynamic process is inputted into the trained model for monitoring the nonlinear dynamic process.

The model may be a KLASS model. The model can have a layered architecture: the first layer can be an outer layer to handle nonlinearity with kernel method; the second layer can be an inner layer that is between the first layer and the third layer to extract predictable dynamic latent variables (DLVs); and the third layer can be an inner layer to transit intrinsic state variables (SVs). Taking an example of a high dimensional time series data $y_k \in \mathbb{R}^p$ with p variables and N+s samples, detailed modeling strategies in distinct layers are further discussed below.

The outer layer can be used to address the non-linearities inherent in the process data. By employing kernel methods, the standardized (scaled to zero mean and unit variance) measurement $y_k$ can be lifted to a high-dimensional feature space $\mathcal{H}$ through nonlinear mapping $\phi$ induced by a kernel function using kernel method as $$y_k^{\mathcal{H}} = \phi(y_k), \tag{1}$$

such that $$y_k^{\mathcal{H}}$$

$\in \mathbb{R}^D$ is a nonlinear feature that is driven by a set of DLVs $v_k \in \mathbb{R}^\ell$ with $\ell$ being the latent dynamics dimension. The relationship between the nonlinear feature and the DLVs can be expressed as follows $$y_k^{\mathcal{H}} = P v_k + e_k \tag{2}$$

with $P \in \mathbb{R}^{D \times \ell}$ serving as a loading matrix and $e_k$ is serially independent noise. For the matrix expression, the nonlinear feature and DLVs in matrix form can be formulated in time-shifted matrices as follows $$Y_i^\phi = [\phi(y_{i+1}) \quad \phi(y_{i+2}) \quad \ldots \quad \phi(y_{i+N})]^T \in \mathbb{R}^{N \times D} \tag{3}$$

$$V_i = [v_{i+1} \quad v_{i+2} \quad \ldots \quad v_{i+N}]^T \in \mathbb{R}^{N \times \ell} \tag{4}$$

for i=1, 2, . . . , s. Then, there exists a weight matrix $R \in \mathbb{R}^{D \times \ell}$ such that $$V_s = Y_i^\phi R \tag{5}$$

This transformation can linearize complex relationships, allowing the system to handle non-linearities more effectively.

The second layer can be used for extraction of predictable dynamics. The second layer aims to optimize the DLVs $v_k$ for predictability, i.e., minimizing the prediction errors associated with these DLVs and their predictions, which is represented in the following:

$$\min J = \left\| V_s - \hat{V}_s \right\|_F^2 \tag{6}$$

6 where $\hat{V}_s$ is the prediction of $V_s$. The optimization will allow the extracted DLVs to be the most predictable and minimally redundant.

The inner layer can be used for capturing long-term intrinsic dynamics. The inner layer may utilize a latent state space model to transit intrinsic dynamics within the system, which is defined by the following expressions $$x_{k+1} = A x_k + K \varepsilon_k \tag{7}$$

$$v_{k+1} = C x_k + \varepsilon_k \tag{8}$$

where $x_k \in \mathbb{R}^n$ is the state variable, $\varepsilon_k$ is the innovation, A is the latent state transition matrix, K is the Kalman gain, and C is the emission matrix. By employing the above latent state space model, the inner layer can beneficially provide a compact and general representation of the system's intrinsic dynamics, reducing a scale of parameterization as compared to typical methods.

Figure 2:
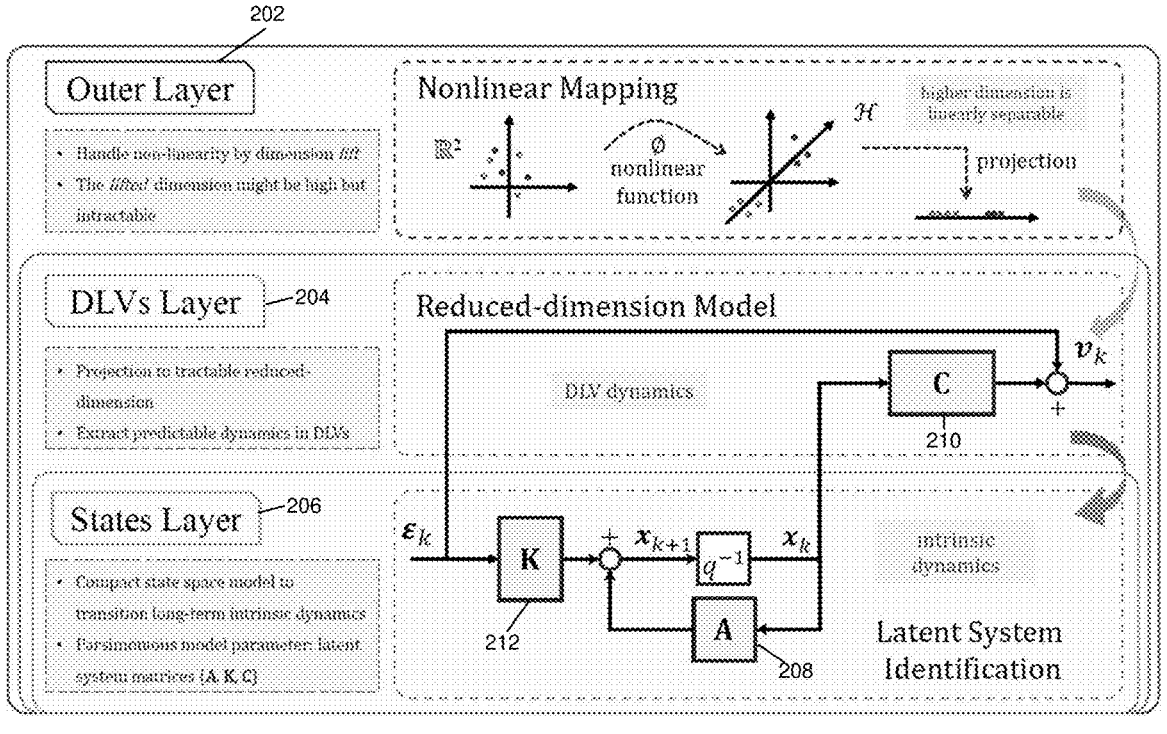
FIG. 2 is a schematic representation illustrating a layered architecture of the model of FIG. 1.

FIG. 2 is a schematic representation 200 illustrating a layered architecture of the model of FIG. 1. As shown in FIG. 2, the model can be structured into three distinct layers—the outer layer 202, the DLVs layer 204 and the states layer 206, each designed to manage different aspects of a process modeling task. The outer layer 202 can be used for addressing the non-linearities inherent in the process data.

As mentioned above, the first layer of the model, which can be the outer layer 202, is configured to linearize the sample data using one or more dimension lifting techniques. According to one embodiment, linearizing the sample data may comprise nonlinearly mapping the sample data into a high-dimensional feature space. Advantageously, the data is simplified to facilitate subsequent processing of the data. Specifically, nonlinear mapping transforms complex, non-linear relationships in the original data into linear relationships in the high-dimensional feature space, such that subsequent computations (dimensionality reduction or state space modeling) become more straightforward and efficient.

The one or more dimension lifting techniques may comprise one or more kernel methods. Beneficially, simplification of the nonlinear optimization problem can be achieved with kernel methods. By further employing the kernel trick, direct computation involved in nonlinear optimization problems can be avoided. This reduces computational burdens. In addition, selection of the kernel function allows for various levels of nonlinear expressiveness.

By employing the dimension lifting techniques, the outer layer 202 can nonlinearly map an original data into the high-dimensional feature space, where lifted dimensions can be more linearly separable. In the DLVs layer 204, mapped features can be projected as DLVs in reduced dimensional subspace, where dynamics in DLVs may be the most predictable. In the states layer 206, the extracted DLVs may be parameterized with latent state space model with parsimony, where latent states transit long-term intrinsic dynamics.

As mentioned above, the second layer of the model, which can be the DLVs layer 204, is configured to extract reduced-dimension DLVs from the linearized sample data using a reduced-dimension model. According to one embodiment, the reduced-dimension model may comprise a weight matrix. The weight matrix can project mapped data from an infinite-dimensional feature space into a finite-dimensional subspace. The infinite-dimensional feature space may be created by the kernel function or kernel mapping, which may be intractable. The finite-dimensional subspace may be of a tractable dimension. This advantageously reduces computational complexity and makes the resulting dynamic latent variables (DLVs) more manageable and suitable for further afterwards processing.

As mentioned above, the third layer of the model, which can be the states layer 206, is configured to parameterize the extracted reduced-dimension DLVs using a latent state space model. In one implementation, the latent state space model may comprise system matrices. Advantageously, using system matrices can achieve model parsimony. The use of system matrices enables the latent state space model to describe complex dynamic behaviors with fewer parameters compared to alternative methods like high-order autoregressive models. This reduces overfitting risks and improves the model's efficiency. The system matrices may comprise a latent state transition matrix 208, an emission matrix 210 and a Kalman gain matrix 212. The system matrices (e.g., the latent state transition matrix 208, the emission matrix 210, and the Kalman gain matrix 212) provide a compact yet accurate representation of the system's intrinsic dynamics. The system matrices capture how the latent state variables evolve over time (reflected in the latent state transition matrix 208) and how they relate to observed data (reflected in the emission matrix 210), ensuring accuracy in predicting system behavior and identifying deviations, which are reflected in the Kalman gain matrix 212.

According to one embodiment, the method for monitoring the nonlinear dynamic process may further comprise updating the weight matrix and the system matrices using an alternating optimization algorithm. Beneficially, efficient model parameters estimation can be achieved. The model parameters can be the weight matrix and the system matrices. The weight matrix and the system matrices may be bilinear in the modeling method. In other words, the relationship between the weight matrix and the system matrices may involve coupled dependencies. This allows the use of an alternating optimization algorithm, where one set of parameters is fixed while the other is updated iteratively. This approach simplifies the complex optimization problem into manageable subproblems, ensuring efficient and stable parameter estimation.

The model parameters to be optimized may include the system matrices {A, K, C} and the weight matrix. Optimizing the model parameters may be performed through iteration in an alternating manner. Without loss of generality, the weight matrix can be assumed to be initialized.

Estimation of system matrices will be discussed in this paragraph. Assuming the weight matrix is available for calculating the DLVs, a Hankel matrix can be arranged using these DLVs. Next, the latent state sequences X can be retrieved from the Hankel matrix utilizing a singular value decomposition according to subspace identification. Blocks of state sequences can be formulated as follows:

$$X_{s-1}=[x_s\ x_{s+1}\ \dots\ x_{s+N-1}]^T \in \mathbb{R}^{N \times n} \tag{9}$$

$$X_s=[x_{s+1}\ x_{s+2} \dots\ x_{s+N}]^T \in \mathbb{R}^{N \times n} \tag{10}$$

The state transition matrix 208 can be estimated by $$A = X_s^T (X_{s-1}^+)^T \in \mathbb{R}^{n \times n} \tag{11}$$

where $$X_{s-1}^+$$

is Moore-Penrose pseudo-inverse of $X_{s-1}$. The emission matrix 210 can be calculated as follows $$C = V_s^T (X_s^+)^T \in \mathbb{R}^{\ell \times n} \tag{12}$$

Then, the Kalman gain matrix K 212 can be optimized according to discrete-time algebraic Riccati equation (DARE). With the updated system matrices, the DLVs can be filtered with equations (7) and (8).

Estimation of the weight matrix will be discussed in this paragraph. A direct solution to the weight matrix R within the feature space can be intractable. By Representer's theorem, the weight matrix R can be theoretically represented by a matrix $\alpha$ as $$R = (Y_s^\phi)^T \alpha.$$

Hence, the latent DLVs scores may be computed as $$V_s = Y_s^\phi R = Y_s^\phi (Y_s^\phi)^T \alpha = G\alpha \tag{13}$$

where $$G = Y_s^\phi (Y_s^\phi)^T \in \mathbb{R}^{N \times N}$$

is a kernel matrix. Each element in the kernel matrix can be computed by $$G_{ij}=\kappa(y_i, y_j) \tag{14}$$

with $\kappa(\ \dots\ )$ being the kernel function. To implement DLVs with zero mean, the computed matrix G should be centralized.

To compute the solution, an economical singular value decomposition (SVD) of the kernel matrix may be performed as follows:

$$G=\mathcal{U}\mathcal{D}\mathcal{U}^T, \tag{15}$$

where $\mathcal{U}-\mathbb{R}^{N \times r}$ is orthogonal and $\mathcal{D} \in \mathbb{R}^{r \times r}$ is diagonal with r being non-zero singular values. Efficiency of the computation may be increased in this manner. At the same time, an equivalent weight matrix $W \in \mathbb{R}^{r \times \ell}$ may be adopted in an alternating or iterative optimization algorithm. W may be initialized before the iterations. In each round of iteration, the following steps may be conducted in a loop:
i) Update the DLVs:

$$V=\mathcal{U} \tag{16}$$

ii) Estimate the system matrices {A, K, C}
iii) Calculate the filtered DLVs $\hat{V}$ using (7) and (8)
iv) Perform SVD on the term $\mathcal{U}^T \hat{V}$:

$$\mathcal{U}^T \hat{V}=M\Lambda N^T \tag{17}$$

v) Update equivalent weight matrix:

$$W=MN^T \tag{18}$$

vi) Check convergence of W; if W converges, break loop; otherwise, go to step i)

vii) After convergence, update weight $$\alpha = \boldsymbol{UD}^{-1}W \tag{19}$$

As mentioned above, the trained model can be used to monitor processes such as the nonlinear dynamic process. A fault detection and fault identification method based on the trained model will be discussed below.

The method for fault detection will be discussed as follows. The model may improve fault detection capabilities by integrating dynamic and static indices. The dynamic and static indices can be useful in detecting subtle and/or severe variations in process behaviors by leveraging DLVs prediction and measurements reconstruction residuals, respectively. Advantageously, the method provides a robust framework for pinpointing deviations from normal operational conditions (NOC). The dynamic and static indices can provide a comprehensive view of the system's behavior in the outer layer (i.e. the first layer) and the inner layers (i.e. the second layer and the third layer).

According to one embodiment, the first layer, which can be the outer layer, can be further configured to compute reconstruction residuals. The second layer and the third layer, which can be the inner layers, can be further configured to compute DLVs prediction residuals. A process monitoring strategy that utilizes the reconstruction residuals and the DLVs prediction residuals to detect variations with static and dynamic variability can be formed. By utilizing reconstruction residuals from the first layer to detect static variations and DLVs prediction residuals from the second layer and the third layer to detect dynamic variations, the process monitoring strategy ensures that process deviations are monitored accurately. A driving source of the second layer and the third layer can be from innovations. In process monitoring, it is possible to only calculate one statistic for the second layer and the third layer.

Monitoring static variations at the outer layer may comprise using kernel trick to compute the reconstruction residuals. To perform the computation, a DLV vector can be calculated as follows $$v_k = R^T\phi(y_k) = \alpha^T Y_s^\phi \phi(y_k) = \alpha^T \kappa(Y_s, y_k), \tag{20}$$

where $$\kappa(Y_s, y_k) = Y_s^\phi \phi(y_k) \tag{50}$$

represents the kernel-transformed vector in kernel method. The above equation may allow explicit mapping from data vector $y_k$ to the DLVs.

An optimal loading matrix P can be presented as $$P = Y_s^{\phi^T} V_s \tag{21}$$

The reconstruction residual can be presented as $$e_k^y = \phi(y_k) - Pv_k \tag{22}$$

The reconstruction residual can be monitored in a squared error form. By leveraging the kernel trick, a static monitoring index can be presented as $$Q_{e,k} = e_k^{y^T} e_k^y = \kappa(y_k, y_k) - 2v_k^T V_s^T \kappa(Y_s, y_k) + v_k^T V_s^T G V_s v_k \tag{23}$$

Upon calculating the reconstruction residuals in the outer layer, vanilla squared prediction error (SPE) can be constructed. The SPE may also be known as Q statistic for process monitoring.

Monitoring dynamic variations at the inner layers may comprise calculating monitoring residuals in the inner layers. The inner layers may be dynamic. To calculate the monitoring residuals in the inner layers, the DLV score vectors may be computed using equation (20). Subsequently, the estimated system matrices {A, K, C} and the DLV scores can be used to calculate the DLV predictions and the residuals as $$\varepsilon_k = v_k - \hat{v}_k \tag{24}$$

The residual $\varepsilon_k$ may be suitable for process monitoring, as it removes auto-correlation contaminated in the DLVs.

Following the estimation of DLVs prediction residuals $\varepsilon_k$, vanilla PCA may be performed on $\varepsilon_k$ to construct two statistics for process monitoring: a Hotelling's T-squared statistic and a Q statistic. For innovation monitoring in the model, Hotelling's T-squared statistic and the Q statistic can be denoted as $$T_v^2$$

and $Q_v$, respectively. PCA may then be performed on $\varepsilon_k$ to obtain a first $\ell_{T_v}$ principal components (PCs) $t_{v,k}$ and the corresponding innovation residual $\tilde{t}_{v,k}$. The $$T_v^2$$

monitoring index at the k-th sample can be calculated as follows, $$T_{v,k}^2 = t_{v,k}^T \Lambda_v^{-1} t_{v,k} \tag{25}$$

with $\Lambda_v$ being a sample covariance matrix of the innovation PCs $t_{v,k}$ during NOC. The innovation residual components $t_{v,k}$ should be monitored in the squared error form as expressed in $$Q_{v,k} = \tilde{t}_{v,k}^T \tilde{t}_{v,k} \tag{26}$$

The corresponding control limits for $$Q_{e,k}, T_{v,k}^2,$$

and $Q_{v,k}$ can be constructed in the same way as in the vanilla PCA-based process monitoring.

Figure 3:
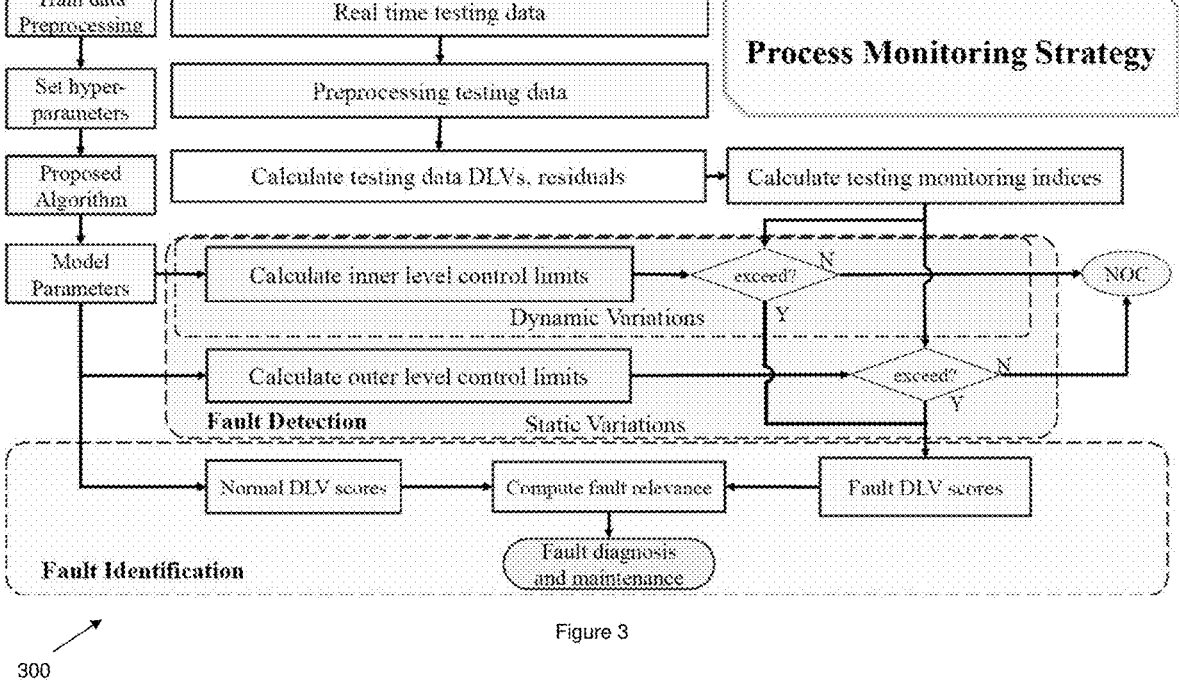
FIG. 3 is a flow chart illustrating an example of an online process monitoring strategy based on the model of FIG. 1, according to an embodiment.

FIG. 3 is a flow chart 300 illustrating an example of an online process monitoring strategy based on the model of FIG. 1, according to an embodiment. As shown in FIG. 3, to perform online monitoring of real-time data, indices may be calculated, i.e., $Q_{e,k}$ in the first layer (i.e. outer layer), $$T_{v,k}^2$$

with $Q_{v,k}$ in the second layer, their respective control limits. Accordingly, online process monitoring procedures based on the model can be as follows:

i) Scale the real-time samples: Each real-time sample can be first standardized using a mean and standard deviation of a training set to obtain $y_k$.

ii) Transformation, projection, and transition: At the outer layer, the standardized sample $y_k$ can be transformed into a feature space using the kernel function. Subsequently, the mapped features can be projected onto a latent space to estimate a DLV sample, $v_k$ as in (20). This step may leverage the kernel trick to enhance computational efficiency. With the DLVs, expression (7) can be performed to transit the latent states $x_k$ at the inner layer.

iii) Monitor dynamic variations at the inner layer: The DLV prediction residual, $\varepsilon_k$, can be computed as in (24). By conducting PCA on the DLV prediction residual $\varepsilon_k$, the indices $$T_{v,k}^2$$

in (25) and $Q_{v,k}$ in (26) can be computed to monitor the dynamic variations at the second layer.

iv) Monitor static variations at the outer layer: The reconstruction residuals of the measurements, $$e_k^y,$$

can be used to calculate the monitoring index $Q_{e,k}$ as in (23). The monitoring index may allow detection of static variations at the outer layer, which can be comparable to the $Q_e$ indices in KPCA, KDPCA, and KCVA, complementing a comprehensive scheme of fault detection.

v) Evaluating monitoring performance: The final step may involve comparing the calculated indices against their respective control limits. Any testing index exceeding its control limit with the specified consecutive samples may indicate a fault or variation. Thereafter, fault detection delays can be counted to assess the responsiveness of the monitoring models. Otherwise, the process can be considered under NOC.

Beneficially, the above integration of residuals from static and dynamic perspectives presents a comprehensive assessment for complex process monitoring.

Fault identification plays a relatively important role in comprehensive process monitoring. The fault identification method based on the model will be described below. The model may be able to extend its utility to fault identification by leveraging fault relevance analysis in conjunction with latent variable modeling.

When a fault is detected within process measurements, it can be important to systematically analyze the process variables associated with the anomaly. According to an embodiment, the model may further comprise a fault label matrix configured to identify a fault condition in the non-linear dynamic process. The fault label matrix provides a clear distinction between normal operating conditions (NOC) and fault conditions, serving as a binary indicator of process health. Advantageously, using a fault label facilitates calculation of fault relevance. The mutual information (MI) between fault labels and each dynamic latent variable can be computed to measure the dependency between the fault condition and the latent variables, ensuring a comprehensive assessment of how each variable influences fault conditions. The fault label matrix may be represented by L*. Corresponding process measurements and DLVs under both NOC and during fault conditions Y* and V* may be represented as follows:

$$L^* = \begin{bmatrix} L_{NOC}^T & L_{fault}^T \end{bmatrix}^T \tag{27}$$

$$Y^* = \begin{bmatrix} Y_{NOC}^T & Y_{fault}^T \end{bmatrix}^T \tag{28}$$

$$V^* = \begin{bmatrix} V_{NOC}^T & V_{fault}^T \end{bmatrix}^T \tag{29}$$

This beneficially allows for an efficient comparison and analysis of process data collected during both normal and abnormal conditions.

A classification problem can be transformed to a regression model between the latent variables and the process variables, which is reflected in fault identification weights $\Omega$ as $$\Omega = (Y^{*T}Y^*)^{-1}Y^{*T}V^* \tag{30}$$

to measure the quantitative sensitivity of each process variable to the identified anomalies. This weight matrix can be important for calculating fault relevance of each variable $Y^i$ that contribute to the fault. In this manner, a reconstruction procedure can be avoided, hence efficiency is improved.

The fault relevance for each process variable, denoted as $FR_{Y^i}$ can be calculated using a combination of a mutual information (MI) between the fault labels L* and each latent variable $V^j$, and also the i,j-th element in the weight matrix $\Omega$ by $$FR_{Y^i} = \frac{\sum_{j=1}^{\ell} MI(L^*, V^j)\Omega_{i,j}}{\sum_{j=1}^{\ell} MI(L^*, V^j)}, i = 1, 2, \dots, p \tag{31}$$

The $FR_{Y^i}$ assesses a relative contribution of each variable to the detected fault, effectively guiding diagnostic efforts towards the most influential causes. The fault relevance can be calculated within specific latent variable model used, such as PCA, CVA, or any other LVs-based analytics framework, and the fault identification strategy can remain valid.

Model validation with a process monitoring application will be described below. The effectiveness of the model is assessed through two case studies. First, feasibility on the Tennessee Eastman Process (TEP), leveraging a newly enhanced simulation paradigm is explored. Second, the model's effectiveness is tested on a real multi-phase flow facility (MPFF), examining its capability in managing complex nonlinear dynamics. For both cases, the model's performance is compared against established dynamic and nonlinear modeling techniques, including DPCA, CVA, KPCA, DKPCA, and KCVA algorithms.

The TEP, a benchmark for process control and monitoring research, can reflect complex non-linearity of industrial processes. Modification is conducted with adjustment of a sampling interval to 36 seconds from a traditional three minutes, enhancing the dataset's capacity to reflect more complex nonlinear dynamics and providing a different test environment for process monitoring methods. Manipulated variables XMV1-4, XMV6-8, XMV10, XMV11, and measurement variable XMEAS1-22 have been selected for modeling in the TEP case. Using an enhanced TEP dataset, the process monitoring models are tasked with detecting fault scenarios across various disturbance represented by IDV(1) to IDV(21), with IDV(0) serving as a control to measure the false alarm rate (FAR). For this study, 1000 training samples and 1000 test samples are collected for each IDV case. The process variations are introduced at the 201-st sample until the end of each test phase. All the experiments are carried out using 22 measurement variables denoted by XMEAS and 9 manipulated variables denoted by XMV.

Fault detection performance of the model's algorithm and the alternative methods is summarized in Table 1. The model is denoted as KLaSS. Table 1 presents metrics false alarm rate (FAR), fault detection rate (FDR) in percentages, and detection delays in samples. These metrics can be important for evaluating the models' sensitivity and timeliness in detecting process deviations. The results in the IDV(0) case indicate the FAR of the model and alternative methods. It can be seen in Table 1 that the model consistently exhibits higher FDRs with shorter detection delays in all the IDV cases, signifying an improved capability in detecting various fault types.

TABLE 1

| IDV | DPCA | | | CVA | | | KPCA | | | DKPCA | | | KCVA | | |
|---|---|---|---|---|---|---|---|---|---|---|---|---|---|---|---|
| | $T_y^2$ | $Q_y$ | delay | $T_y^2$ | $Q_y$ | delay | $T_y^2$ | $Q_y$ | delay | $T_y^2$ | $Q_Y$ | delay | $T_y^2$ | $Q_y$ | delay |
| 0 | 0.1 | 0.6 | — | 0 | 2.1 | — | 1.5 | 5.5 | — | 0 | 6.5 | — | 0.1 | 0.6 | — |
| 1 | 98.9 | 99.0 | 10 | 99.4 | 98.0 | 6 | 98.5 | 98.5 | 14 | 94.3 | 90.4 | 12 | 98.2 | 98.5 | 12 |
| 2 | 90.2 | 85.5 | 84 | 94.1 | 38.3 | 59 | 93.0 | 57.1 | 51 | 94.3 | 78.5 | 52 | 89.7 | 90.6 | 66 |
| 3 | 17.8 | 25.1 | 597 | 51.0 | 3.6 | 217 | 35.1 | 11.9 | 221 | 40.0 | 25.7 | 57 | 17.8 | 21.5 | 224 |
| 4 | 100 | 100 | 0 | 100 | 100 | 0 | 99.9 | 86.4 | 1 | 88.6 | 80.2 | 3 | 100 | 100 | 0 |
| 5 | 100 | 100 | 0 | 100 | 100 | 0 | 99.9 | 24.7 | 1 | 99.9 | 99.9 | 1 | 100 | 100 | 0 |
| 6 | 100 | 100 | 0 | 100 | 100 | 0 | 99.8 | 94.8 | 1 | 99.8 | 98.5 | 1 | 100 | 100 | 0 |
| 7 | 100 | 100 | 0 | 100 | 100 | 0 | 99.9 | 99.9 | 1 | 99.6 | 99.9 | 1 | 99.9 | 100 | 0 |
| 8 | 89.2 | 88.6 | 87 | 89.6 | 81.9 | 86 | 88.6 | 74.9 | 89 | 88.1 | 89.6 | 83 | 88.1 | 88.3 | 92 |
| 9 | 41.1 | 46.9 | 110 | 82.9 | 5.7 | 96 | 39.0 | 10.6 | 99 | 38.8 | 34.3 | 100 | 21.1 | 25.3 | 99 |
| 10 | 80.6 | 82.7 | 140 | 83.0 | 75.9 | 136 | 75.4 | 53.4 | 146 | 74.8 | 74.8 | 146 | 71.4 | 71.7 | 147 |
| 11 | 95.5 | 97.6 | 17 | 97.6 | 79.0 | 20 | 89.0 | 72.5 | 21 | 68.3 | 66.2 | 25 | 81.5 | 87.1 | 20 |
| 12 | 98.0 | 98.3 | 14 | 98.2 | 97.7 | 15 | 97.9 | 61.2 | 17 | 97.5 | 97.0 | 18 | 98.0 | 98.1 | 15 |
| 13 | 81.7 | 82.2 | 150 | 84.3 | 53.4 | 132 | 82.7 | 64.8 | 142 | 82.2 | 69.2 | 143 | 82.3 | 82.5 | 141 |
| 14 | 99.8 | 100 | 0 | 100 | 42.7 | 0 | 90.6 | 66.9 | 4 | 37.3 | 17.7 | 405 | 62.2 | 99.0 | 2 |
| 15 | 1.3 | 3.3 | — | 8.8 | 2.3 | — | 6.0 | 6.5 | — | 6.1 | 10.1 | 164 | 0.9 | 2.1 | — |
| 16 | 3.1 | 8.7 | 788 | 18.0 | 2.0 | 75 | 5.5 | 7.4 | 786 | 6.2 | 16.6 | 334 | 2.1 | 3.1 | — |
| 17 | 78.6 | 78.7 | 173 | 79.9 | 57.2 | 169 | 73.8 | 29.0 | 196 | 75.7 | 40.1 | 145 | 69.1 | 71.0 | 195 |
| 18 | 49.0 | 49.1 | 420 | 56.2 | 40.2 | 419 | 56.9 | 39.2 | 167 | 56.8 | 54.6 | 145 | 47.7 | 50.3 | 186 |
| 19 | 97.4 | 97.0 | 21 | 97.5 | 96.2 | 22 | 97.1 | 90.9 | 23 | 96.9 | 96.3 | 24 | 96.9 | 97.4 | 21 |
| 20 | 77.9 | 78.3 | 173 | 79.3 | 77.1 | 173 | 72.4 | 43.1 | 167 | 76.4 | 74.7 | 145 | 61.1 | 72.6 | 166 |
| 21 | 1.6 | 4.1 | — | 7.0 | 2.6 | — | 3.1 | 7.5 | — | 2.6 | 10.0 | 215 | 0.8 | 1.1 | — |
| Avg | 71.5 | 72.6 | 147 | 77.5 | 59.7 | 86 | 71.6 | 52.4 | 113 | 67.8 | 63.1 | 106 | 66.1 | 69.5 | 77 |

| IDV | KLaSS | | | | | |
|---|---|---|---|---|---|---|
| | $T_v^2$ | $Q_v$ | $T_x^2$ | $Q_x$ | $Q_y$ | delay |
| 0 | 7.0 | 4.5 | 5.5 | 2.5 | 4.5 | — |
| 1 | 99.3 | 99.1 | 99.4 | 98.6 | 99.3 | 7 |
| 2 | 96.3 | 92.6 | 96.5 | 85.6 | 96.6 | 19 |
| 3 | 85.0 | 52.4 | 81.9 | 48.0 | 80.4 | 6 |
| 4 | 99.9 | 99.9 | 99.9 | 99.9 | 99.9 | 1 |
| 5 | 99.9 | 99.9 | 99.9 | 99.9 | 99.9 | 1 |
| 6 | 99.8 | 99.8 | 99.8 | 99.8 | 99.8 | 1 |
| 7 | 99.9 | 99.9 | 99.9 | 99.9 | 99.9 | 1 |
| 8 | 91.4 | 89.1 | 91.1 | 89.5 | 90.9 | 82 |
| 9 | 87.4 | 60.6 | 87.1 | 57.6 | 88.0 | 90 |
| 10 | 88.1 | 84.1 | 89.1 | 85.1 | 86.6 | 133 |
| 11 | 97.9 | 95.4 | 97.6 | 97.3 | 97.8 | 17 |
| 12 | 98.0 | 98.1 | 98.0 | 98.0 | 98.1 | 16 |
| 13 | 88.4 | 83.9 | 88.0 | 82.1 | 87.9 | 133 |
| 14 | 99.9 | 98.1 | 99.9 | 99.3 | 99.9 | 1 |
| 15 | 59.6 | 32.8 | 57.0 | 28.6 | 46.6 | 160 |
| 16 | 63.8 | 34.3 | 60.0 | 35.1 | 53.7 | 70 |
| 17 | 87.3 | 82.9 | 87.8 | 83.0 | 84.5 | 170 |
| 18 | 80.4 | 67.8 | 80.1 | 64.9 | 75.9 | 163 |
| 19 | 98.9 | 97.5 | 98.5 | 97.8 | 97.9 | 22 |
| 20 | 87.6 | 81.5 | 87.6 | 81.6 | 84.4 | 169 |
| 21 | 55.9 | 29.7 | 51.9 | 28.1 | 42.1 | 203 |
| Avg | 88.8 | 80.0 | 88.1 | 79.0 | 86.2 | 70 |

Figure 4:
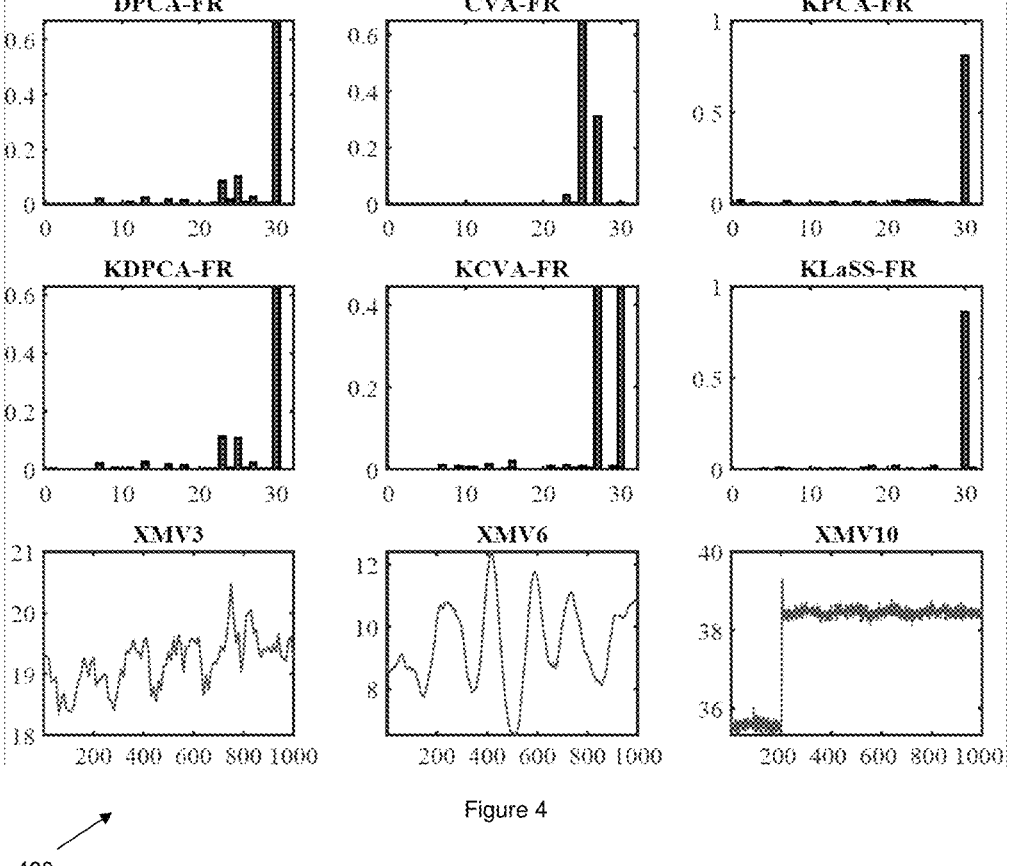
FIG. 4 shows example results of fault identification and identified variables using various methods.

Following the detected variations of the IDVs, identifying the most relevant process variables related to the anomaly can be important for root cause diagnosis and targeted interventions. As all the process monitoring methods are based on the latent variables, the model and alternative methods can be used to facilitate fault identification through FR-based approach linking the latent variables with fault labels. Representative fault types are selected as follows: step variations (IDV(4)-IDV(7)), random variations (IDV (11)), and unknown variations (IDV(17), IDV(19)). Their corresponding fault identification results are listed in Table 2, where only measured variables with the largest two FRs are displayed.

ing water outlet of reactor), which can be seen from the FR results and the measured variables in FIG. 4. The fault identification result is not surprising since the CVA and KCVA models adopt larger lags of measured variables as compared to the other methods for dynamic modeling, which suffer from smearing effects while performing the reconstruction procedure.

Similar results can be seen in IDV11 (random fault in cooling water inlet temperature of reactor). The CVA model failed to identify the correct XMV10. In addition, deviations of heat transfer within reactor happened in IDV(17), and the model and all the methods identified XMEAS21 (reactor cooling water outlet temperature), except the CVA model.

TABLE 2

| | DPCA | | CVA | | KPCA | |
|---|---|---|---|---|---|---|
| IDV | Var1: FR (%) | Var2: FR(%) | Var1: FR (%) | Var2: FR(%) | Var1: FR (%) | Var2: FR(%) |
| 1 | XMV10: 66.9 | XMV3: 9.9 | XMV3: 65.0 | XMV6: 31.0 | XMV10: 83.1 | XMV2: 2.2 |
| 5 | XMEAS22: 93.5 | XMEAS18: 4.6 | XMV6: 67.6 | XMEAS22: 27.5 | XMEAS22: 93.8 | XMEAS18: 4.4 |
| 6 | XMV3: 90.2 | XMEAS1: 3.3 | XMV3: 99.8 | XMV6: 0.01 | XMV3: 85.4 | XMEAS16: 4.6 |
| 7 | XMV4: 99.5 | XMV3: 0.2 | XMV3: 58.7 | XMV4: 31.6 | XMV4: 99.6 | XMEAS7: 0.1 |
| 11 | XMV10: 61.8 | XMV1: 7.6 | XMV6: 58.2 | XMV3: 36.8 | XMV10: 69.0 | XMEAS21: 14.5 |
| 17 | XMEAS21: 92.9 | XMV10: 6.1 | XMV3: 82.6 | XMV6: 12.3 | XMEAS21: 81.7 | XMV10: 12.6 |
| 19 | XMEAS22: 39.6 | XMV7: 32.4 | XMV6: 97.9 | XMEAS22: 1.6 | XMEAS22: 42.8 | XMV7: 33.1 |

| | DKPCA | | KOVA | | KLASS | |
|---|---|---|---|---|---|---|
| IDV | Var1: FR (%) | Var2: FR(%) | Var1: FR (%) | Var2: FR(%) | Var1: FR (%) | Var2: FR(%) |
| 4 | XMV10: 62.9 | XMV1: 11.3 | XMV6: 44.6 | XMV10: 44.1 | XMV10: 85.9 | XMEAS21: 2.0 |
| 5 | XMEAS22: 89.4 | XMEAS18: 6.4 | XMEAS22: 93.5 | XMEAS18: 3.5 | XMEAS22: 99.2 | XMEAS18: 0.7 |
| 6 | XMV3: 40.9 | XMEAS16: 30.1 | XMV3: 65.6 | XMEAS11: 9.5 | XMV3: 72.7 | XMEAS7: 13.3 |
| 7 | XMV4: 99.2 | XMV1: 0.3 | XMV4: 96.4 | XMV6: 3.6 | XMV4: 99.7 | XMEAS11: 0.05 |
| 11 | XMV10: 56.6 | XMV1: 8.5 | XMV10: 35.8 | XMV6: 29.1 | XMV10: 35.3 | XMEAS9: 18.7 |
| 17 | XMEAS21: 52.8 | XMV10: 25.8 | XMEAS21: 82.3 | XMV10: 10.8 | XMEAS21: 94.9 | XMV1: 1.6 |
| 19 | XMEAS22: 37.8 | XMV7: 32.0 | XMEAS22: 36.9 | XMV8: 24.0 | XMEAS18: 50.1 | XMEAS22: 10.5 |

The results show that the model denoted as KLASS and almost all alternative methods have identified the correct fault variables to some extent, which verifies effectiveness of the fault identification method based on FR. Take IDV(5) for instance, the fault type is the step deviation in cooling water inlet temperature of the condenser unit, and the model and all the methods identified XMEAS22 (condenser cooling water outlet temperature) as the abnormal variable. For IDV(6), a step variation of loss in A feed in stream 1 occurred, and the model and all the alternative methods identified XMV3 (valve position feed component A (stream 1)). Further, a step anomaly in C header pressure loss (stream 4) was introduced in IDV(7), and the XMV4 (valve position feed component A & C in stream 4) was identified by the model and the alternative methods.

Advantages of the process monitoring method based on the model will be discussed below. In the alternative process monitoring methods, erroneous variables in the fault scenario are identified, namely IDV(4), IDV(11), IDV(17), and IDV(19). FIG. 4 shows example results 400 of fault identification and identified variables using various methods. Through analysis, in IDV(4), a step deviation happened in a cooling water inlet temperature of a reactor, however as can be seen in FIG. 4, the CVA model erroneously identified Variance 25 which corresponds to XMV3 (valve position feed component A) and Variance 27 which corresponds to XMV6 (valve position purge). Further, the KCVA model obtained vague FR results with 44.6% for XMV6 and 44.1% for XMV10 which corresponds to Variance 30. The other methods identified the correct XMV10 (valve position cool- Verification study on a multi-phase flow facility (MPFF) is illustrated. The MPFF presents a challenging scenario for nonlinear dynamic process modeling due to its pressurized system managing the flows of air, water, and oil. The facility's operational complexity is heightened by the interactions among multiple phases in the 3-phase separator and the continuous adjustments required in real-time. The data from MPFF was gathered under various NOCs in a total of three datasets, namely T1, T2, and T3. The dataset T1 with a first 23 variables are used for off-line model training. As for the testing stage, the faulty datasets under steady state conditions across multiple fault scenarios—Fault1.set2 (denoted as F-1.2), Fault3.set2 (denoted as F-3.2), and Fault4.set2 (denoted as F-4.2) are utilized respectively, and are listed in Table 3.

TABLE 3

| Dataset | Fault type | Fault starts | Fault ends |
|---|---|---|---|
| F-1,2 | air line blockage | 657 | 3777 |
| F-3.2 | top separator input blockage | 333 | 5871 |
| F-4.2 | open direct bypass | 851 | 3851 |

Fault detection results, namely FAR and FDR values, as presented in Table 4 and Table 5 highlight the effectiveness of the model in maintaining lower FAR, higher FDR and shorter detection delays. If the FAR value is larger than 70%, or the FDR is far over its corresponding control limit, the model will be regarded as invalid and will be denoted as "-" in Tables 4 and 5.

TABLE 4

| FAR | DPCA | | CVA | | KPCA | | DKPCA | | KCVA | | KLaSS | | | | |
|---|---|---|---|---|---|---|---|---|---|---|---|---|---|---|---|
| | $T^2_y$ | $Q_y$ | $T^2_y$ | $Q_y$ | $T^2_y$ | $Q_y$ | $T^2_y$ | $Q_y$ | $T^2_y$ | $Q_y$ | $T^2_v$ | $Q_v$ | $T^2_x$ | $Q_x$ | $Q_y$ |
| F-1.2 | 13.45 | — | — | 14.10 | 8.02 | 60.73 | 1.78 | 18.71 | 8.05 | 39.42 | 11.95 | 6.53 | 3.94 | 7.21 | 2.75 |
| F-3.2 | 3.62 | — | — | 7.36 | 4.50 | — | 2.86 | — | 14.13 | 23.73 | 29.16 | 10.22 | 8.32 | 12.14 | 4.09 |
| F-4,2 | 11.01 | — | — | 9.60 | 11.03 | — | 18.75 | — | 46.20 | 43.98 | 10.61 | 11.72 | 7.86 | 10.41 | 6.89 |
| Avg. | 9.36 | — | — | 10.35 | 7.85 | 60.73 | 7.80 | 18.71 | 22.79 | 35.71 | 17.24 | 9.49 | 6.71 | 9.92 | 4.58 |

In Table 4, the over-large FAR values in the alternative methods suggest a heightened sensitivity to variations within the MPFF. Both training and test datasets include multiple operation conditions and are thus non-stationary. Typical process monitoring methods are unable to correctly deal with the dynamic and non-stationary nature of the MPFF data. The high sensitivity may be due to pervasive non-linearity of an actual process and smearing effects of extracted latent variables in the alternative methods. In contrast, the model denoted as KLaSS consistently show lower FAR on average.

Figure 5:
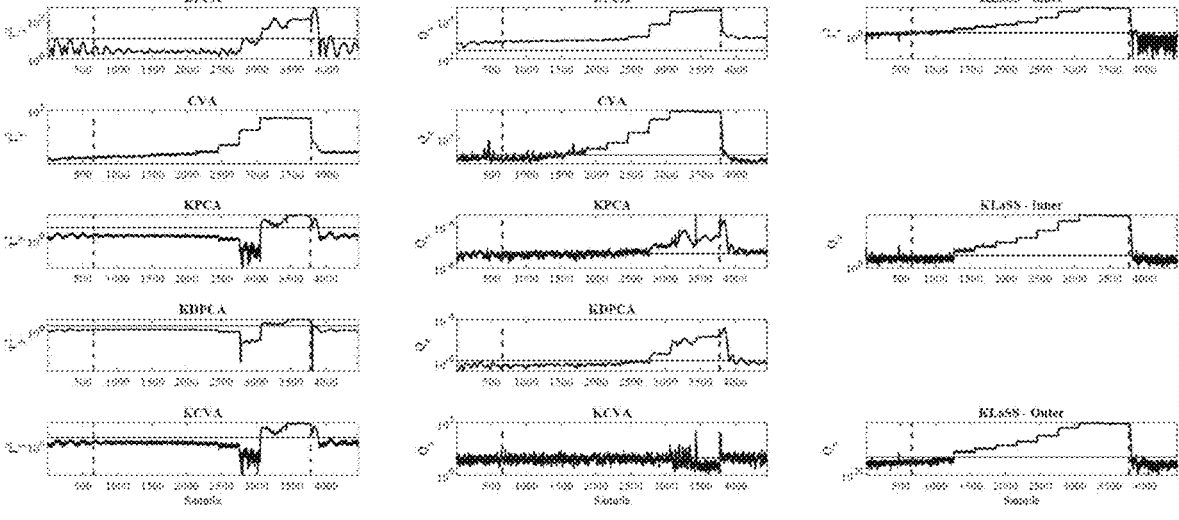
FIG. 5 shows example results of process monitoring of a fault scenario using various methods.

In Table 5, the FDR and detection delays measure effectiveness and timeliness of the model and each alternative method in detecting variations. FIG. 5 shows example results 500 of process monitoring of a fault scenario using various methods. The model denoted as KLASS consistently excels in FDR across all scenarios (F-1.2, F-3.2, F-4.2), achieving high FDRs with substantially lower delays. For instance, in F-1.2, the model achieves an FDR of 94.81% with only a 30-sample delay, showcasing its quick and accurate fault detection capability as can be seen in FIG. 5. CVA and KCVA, while showing acceptable FDR in certain scenarios, have relatively longer detection delays, which may reduce their efficacy in applications requiring rapid response. DPCA, KPCA, and DKPCA display variability in FDR and delays, suggesting relatively poor monitoring performance since these methods either neglect dynamics or inherent non-linearity that cannot be disregarded in the MPFF process.

KLASS are less frequent than the alternative methods. It can be seen that in the alternative methods, there is one index that exceeds the control limits to a great extent, despite that distinct hyper-parameter settings are tested. The model denoted as KLASS consistently shows more stable FAR, better FDR, and quicker detection across all tested scenarios. This can be attributed to the tiered dynamical system design. In contrast, the alternative methods DPCA and CVA have failed to deal with the highly nonlinear, non-stationary data from the MPFF; the KPCA model failed to consider the dynamics contained in the data; and the KDPCA and KCVA methods are limited by the smearing effects of the extracted LVs.

After the faults are detected, the detection results can be used to facilitate the fault identification step. The fault identification results are listed in Table 6. In fault detection indices F-1.2, the manual valve of the air line was gradually closing, simulating the fault of air line blockage. The most related abnormal measurement variable in this scenario is PT312, the air delivery pressure. According to Table 6, the model denoted as KLASS and most of the alternative methods identified PT-312 in this dataset, especially the model with a largest FR of 95.8%. CVA and DKPCA failed to identify correct variables.

As for fault detection indices F-3.2, the fault mode is a top separator input blockage. It can be seen in Table 6 that the model and most of the alternative methods successfully identified critical variables that correlate directly with this

TABLE 5

| FDR | DPCA | | | CVA | | | KPCA | | | DKPCA | | | KCVA | | |
|---|---|---|---|---|---|---|---|---|---|---|---|---|---|---|---|
| | $T^2_y$ | $Q_y$ | delay | $T^2_y$ | $Q_y$ | delay | $T^2_y$ | $Q_y$ | delay | $T^2_y$ | $Q_y$ | delay | $T^2_y$ | $Q_y$ | delay |
| F-1.2 | 24.08 | — | 2157 | — | 75.67 | 353 | 22.79 | 62.72 | 459 | 22 47 | 32.28 | 2314 | 23.04 | 33.58 | 172 |
| F-3.2 | 27.30 | — | 4035 | — | 66.45 | 648 | 26.80 | — | 4103 | 24.76 | — | 4368 | 28.69 | 58.86 | 1931 |
| F-4.2 | 67.63 | — | 304 | — | 87.30 | 302 | — | — | 1128 | 59.30 | — | 1222 | 31.03 | 30.50 | 435 |
| Avg | 39.80 | — | 2165 | — | 76.47 | 464 | 24.80 | 62.72 | 1897 | 35.54 | 32 28 | 2501 | 27.59 | 40.98 | 846 |

| FDR | KLaSS | | | | | |
|---|---|---|---|---|---|---|
| | $T^2_v$ | $Q_v$ | $T^2_x$ | $Q_x$ | $Q_y$ | delay |
| F-1.2 | 94.81 | 80.12 | 44.49 | 83 62 | 80.74 | 30 |
| F-3.2 | 89.85 | 71.51 | 55.62 | 75.10 | 65.62 | 4 |
| F-4.2 | 66.27 | 89.37 | 48.17 | 89.27 | 88.33 | 305 |
| Avg | 83.64 | 80.67 | 49.43 | 82.66 | 78 23 | 113 |

Figure 6:
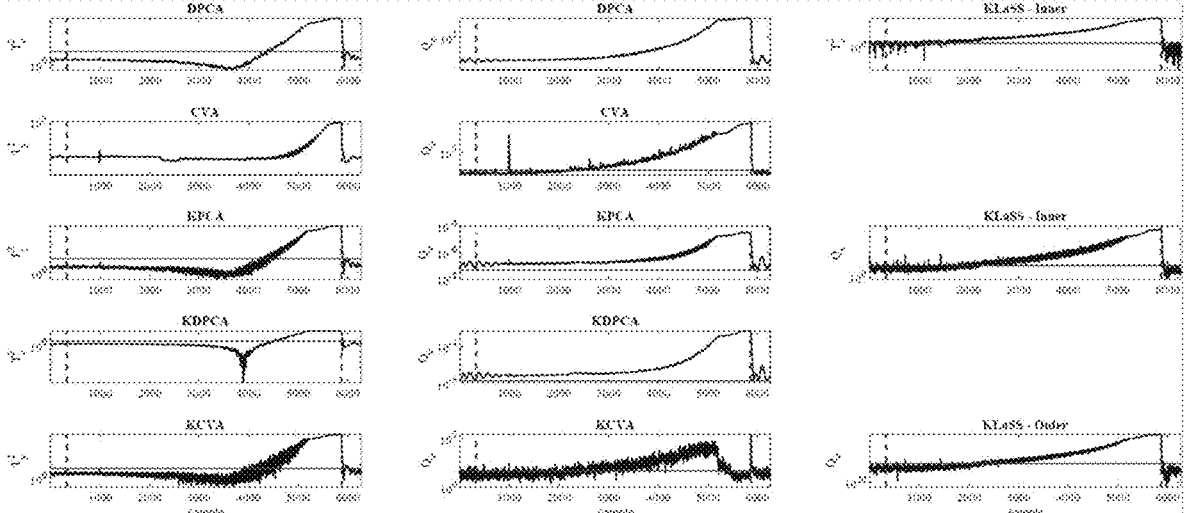
FIG. 6 shows example results of process monitoring of another fault scenario using various methods.
Figure 7:
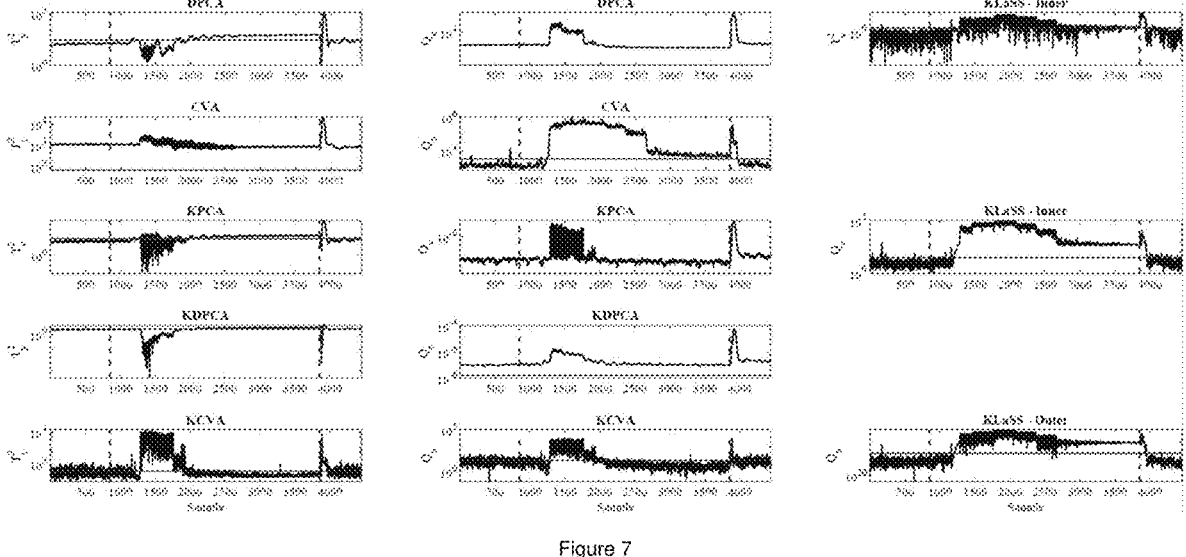
FIG. 7 shows example results of process monitoring of yet another fault scenario using various methods.

FIG. 6 shows example results 600 of process monitoring of another fault scenario using various methods. FIG. 7 shows example results 700 of process monitoring of yet another fault scenario using various methods. Fault detection indices denoted as F-3.2 and F-4.2 are plotted in FIG. 6 and FIG. 7, respectively. From the monitoring curves, it can be observed that false alarms of the model denoted as fault type: PT401 (Pressure at the bottom of the riser), the pressure would be directly affected by any blockage in the flow path leading to the top separator; and also PT312 (Air delivery pressure), which indicates disruptions in the air supply path to the separator. Hence, these two measurements correspond to the two input paths of the top separator, which relate to physical flow paths.

For fault detection indices F-4.2 (open direct bypass), a leakage at the bottom of the riser happened, impacting the flow through the primary processing path. The bypass provides an alternative route for the multi-phase mixture, bypassing the riser section and leading directly to the 3-phase separator. The fault identification results of the model denoted as KLaSS are relatively effective for this fault scenario, as the model can pinpoint pressure variables that are logically connected to the introduced fault. Identified variables include: PT401 with FR 35.1%, PT312 with 32.5% in FR and PT408 (Differential pressure [PT401-PT408]) with FR 31.7%. Changes in a differential pressure between PT401 and PT408 can effectively capture the resultant pressure disparities introduced by the bypass. The sensitivity of PT408 to changes in pressure dynamics due to the bypass makes it a key indicator of the fault in this scenario. On the other hand, the alternative methods failed to identify all the three most relevant measurements.

matrix. The latent state space model may comprise system matrices. The system matrices may comprise a latent state transition matrix, an emission matrix and a Kalman gain matrix.

According to one embodiment, the programming instructions may further instruct the at least one processor to update the weight matrix and the system matrices using an alternating optimization algorithm. The first layer may be further configured to compute reconstruction residuals. The second layer and the third layer may be further configured to compute DLVs prediction residuals. In some implementations, the model may further comprise a fault label matrix configured to identify a fault condition in the nonlinear dynamic process.

Figure 8:
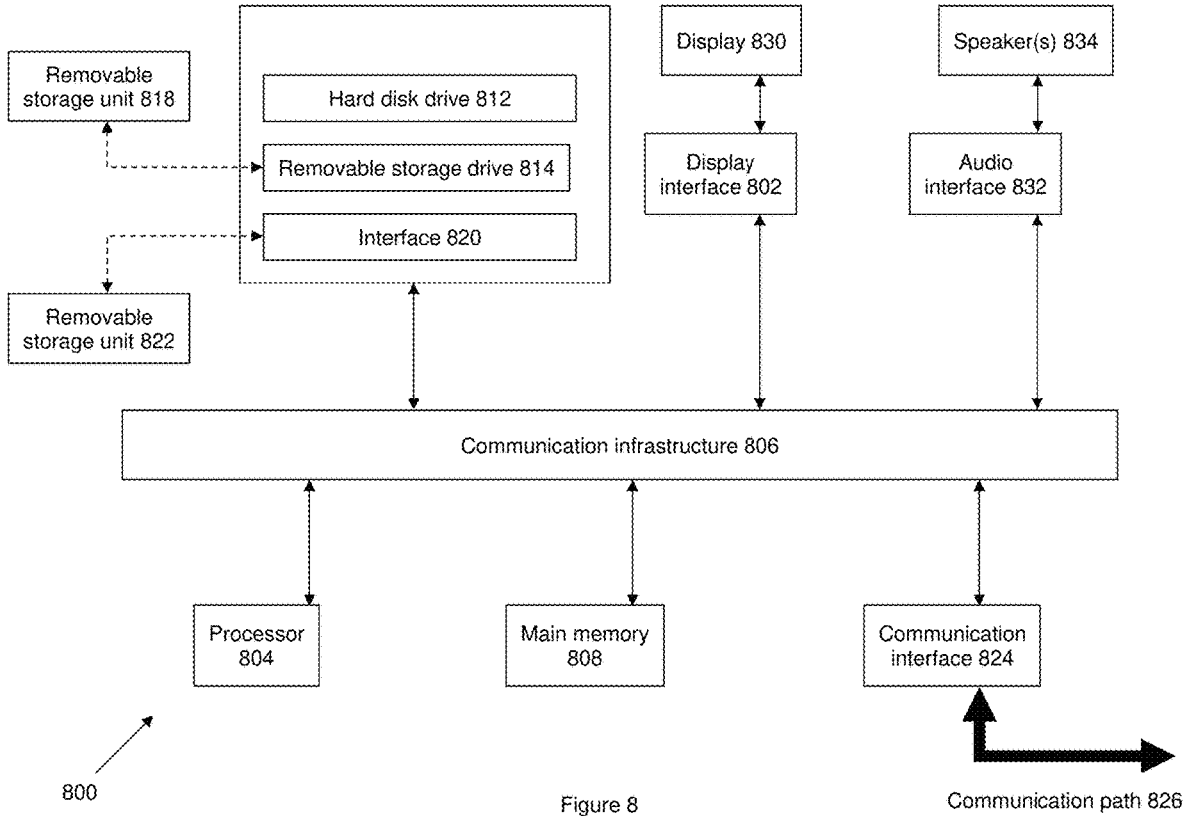
FIG. 8 shows a schematic diagram of a computer system suitable for use in executing at least some steps of the method for monitoring the nonlinear dynamic process.

FIG. 8 shows a schematic diagram 800 of a computer system suitable for use in executing at least some steps of the method for monitoring the nonlinear dynamic process.

TABLE 6

| | DPCA | | CVA | | KPCA | |
|---|---|---|---|---|---|---|
| F- | Var1-FR | Var2-FR | Var1-FR | Var2-FR | Var1-FR | Var2-FR |
| 1.2 | PT312-66.9 | PT408-6.5 | FT406-85.5 | VC501-11.5 | PT312-67.0 | FT407-9.1 |
| 3.2 | PT401-47.5 | PT312-44.1 | FT406-96.2 | PT401-1.5 | PT403-78.0 | PT408-20.3 |
| 4.2 | FT407-21.4 | PT408-15.6 | FT406-98.4 | VC501-1.2 | FT104-18.5 | FT406-15.6 |

| | DKPCA | | KCVA | | KLASS | |
|---|---|---|---|---|---|---|
| F- | Var1-FR | Var2-FR | Var1-FR | Var2-FR | Var1-FR | Var2-FR |
| 1.2 | PT408-41.0 | PT312-27.4 | PT312-27.7 | VC501-16.1 | PT312-95.8 | PT401-2.2 |
| 3.2 | PT401-57.2 | PT312-33.0 | PT401-47.6 | PT312-47.1 | PT401-62.0 | PT312-20.9 |
| 4.2 | PT408-26.8 | FT407-20.1 | PT403-31.4 | PT408-23.0 | PT401-35.1 | PT312-32.5 |

The above results can provide model insights and process interpretability for real-world applications. The process monitoring method based on the model can be applied to data from industrial control systems, industrial internet of things (IIoT) devices, and/or supervisory control and data acquisition (SCADA) systems.

According to one embodiment, a computing system for monitoring a nonlinear dynamic process is provided. The computing system comprises at least one processor. The computing system also comprises a non-transitory computer-readable storage medium coupled to the at least one processor and storing programming instructions for execution by the at least one processor, the programming instructions instruct the at least one processor to train a model based on sample data. The model comprises a first layer. The first layer is configured to linearize the sample data using one or more dimension lifting techniques. The model also comprises a second layer. The second layer is configured to extract reduced-dimension dynamic latent variables (DLVs) from the linearized sample data using a reduced-dimension model. The model also comprises a third layer. The third layer is configured to parameterize the extracted reduced-dimension DLVs using a latent state space model. The programming instructions also instruct the at least one processor to input data from the nonlinear dynamic process into the trained model for monitoring the nonlinear dynamic process.

Linearizing the sample data may comprise nonlinearly mapping the sample data into a high-dimensional feature space. In some implementations, the one or more dimension lifting techniques may comprise one or more kernel methods. The reduced-dimension model may comprise a weight The following description of the computer system/computing device 800 is provided by way of example only and is not intended to be limiting.

As shown in FIG. 8, the example computing device 800 includes a processor 804 for executing software routines. Although a single processor is shown for the sake of clarity, the computing device 800 may also include a multi-processor system. The processor 804 is connected to a communication infrastructure 806 for communication with other components of the computing device 800. The communication infrastructure 806 may include, for example, a communications bus, cross-bar, or network.

The computing device 800 further includes a main memory 808, such as a random access memory (RAM), and a secondary memory 810. The secondary memory 810 may include, for example, a hard disk drive 812 and/or a removable storage drive 814, which may include a magnetic tape drive, an optical disk drive, or the like. The removable storage drive 814 reads from and/or writes to a removable storage unit 818 in a well-known manner. The removable storage unit 818 may include a magnetic tape, optical disk, or the like, which is read by and written to by removable storage drive 814. As will be appreciated by persons skilled in the relevant art(s), the removable storage unit 818 includes a computer readable storage medium having stored therein computer executable program code instructions and/or data.

In an alternative embodiment, the secondary memory 810 may additionally or alternatively include other similar devices for allowing computer programs or other instructions to be loaded into the computing device 800. Such devices can include, for example, a removable storage unit 822 and an interface 820. Examples of a removable storage unit 822 and interface 820 include a removable memory chip (such as an EPROM or PROM) and associated socket, and other removable storage units 822 and interfaces 820 which allow software and data to be transferred from the removable storage unit 822 to the computer system 800.

The computing device 800 also includes at least one communication interface 824. The communication interface 824 allows software and data to be transferred between computing device 800 and external devices via a communication path 826. In various embodiments, the communication interface 824 permits data to be transferred between the computing device 800 and a data communication network, such as a public data or private data communication network. The communication interface 824 may be used to exchange data between different computing devices 800 which such computing devices 800 form part of an interconnected computer network. Examples of a communication interface 824 can include a modem, a network interface (such as an Ethernet card), a communication port, an antenna with associated circuitry and the like. The communication interface 824 may be wired or may be wireless. Software and data transferred via the communication interface 824 are in the form of signals which can be electronic, electromagnetic, optical or other signals capable of being received by communication interface 824. These signals are provided to the communication interface via the communication path 826.

Optionally, the computing device 800 further includes a display interface 802 which performs operations for rendering images to an associated display 830 and an audio interface 832 for performing operations for playing audio content via associated speaker(s) 834.

As used herein, the term "computer program product" may refer, in part, to removable storage unit 818, removable storage unit 822, a hard disk installed in hard disk drive 812, or a carrier wave carrying software over communication path 826 (wireless link or cable) to communication interface 824. Computer readable storage media refers to any non-transitory tangible storage medium that provides recorded instructions and/or data to the computing device 800 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 800. Examples of transitory or non-tangible computer readable transmission media that may also participate in the provision of software, application programs, instructions and/or data to the computing device 800 include radio or infra-red transmission channels as well as a network connection to another computer or networked device, and the Internet or Intranets including e-mail transmissions and information recorded on Websites and the like.

The computer programs (also called computer program code) are stored in main memory 808 and/or secondary memory 810. Computer programs can also be received via the communication interface 824. Such computer programs, when executed, enable the computing device 800 to perform one or more features of embodiments discussed herein. In various embodiments, the computer programs, when executed, enable the processor 804 to perform features of the above-described embodiments. Accordingly, such computer programs represent controllers of the computer system 800.

Software may be stored in a computer program product and loaded into the computing device 800 using the removable storage drive 814, the hard disk drive 812, or the interface 820. Alternatively, the computer program product may be downloaded to the computer system 800 over the communications path 826. The software, when executed by the processor 804, causes the computing device 800 to perform functions of embodiments described herein.

It is to be understood that the embodiment of FIG. 8 is presented merely by way of example. Therefore, in some embodiments one or more features of the computing device 800 may be omitted. Also, in some embodiments, one or more features of the computing device 800 may be combined together. Additionally, in some embodiments, one or more features of the computing device 800 may be split into one or more component parts.

It will be appreciated by a person skilled in the art that numerous variations and/or modifications may be made to the embodiments. The present embodiments are, therefore, to be considered in all respects to be illustrative and not restrictive.

What is claimed is:

1. A method for monitoring a nonlinear dynamic process, comprising:

training a model based on sample data, wherein the model comprises:

a first layer, wherein the first layer is configured to linearize the sample data using one or more dimension lifting techniques;

a second layer, wherein the second layer is configured to extract reduced-dimension dynamic latent variables (DLVs) from the linearized sample data using a reduced-dimension model; and a third layer, wherein the third layer is configured to parameterize the extracted reduced-dimension DLVs using a latent state space model; and inputting data from the nonlinear dynamic process into the trained model for monitoring the nonlinear dynamic process.

2. The method of claim 1, wherein linearizing the sample data comprises nonlinearly mapping the sample data into a high-dimensional feature space.

3. The method of claim 1, wherein the one or more dimension lifting techniques comprises one or more kernel methods.

4. The method of claim 1, wherein the reduced-dimension model comprises a weight matrix.

5. The method of claim 1, wherein the latent state space model comprises system matrices.

6. The method of claim 5, wherein the system matrices comprise a latent state transition matrix, an emission matrix and a Kalman gain matrix.

7. The method of claim 1, wherein:

the reduced-dimension model comprises a weight matrix;

the latent state space model comprises system matrices; and the method further comprises updating the weight matrix and the system matrices using an alternating optimization algorithm.

8. The method of claim 1, wherein the first layer is further configured to compute reconstruction residuals, and wherein the second layer and the third layer are further configured to compute DLVs prediction residuals.

9. The method of claim 1, wherein the model further comprises a fault label matrix configured to identify a fault condition in the nonlinear dynamic process.

10. A computing system, comprising:

at least one processor;

a non-transitory computer-readable storage medium coupled to the at least one processor and storing programming instructions for execution by the at least one processor, the programming instructions instruct the at least one processor to:

train a model based on sample data, wherein the model comprises:

a first layer, wherein the first layer is configured to linearize the sample data using one or more dimension lifting techniques;

a second layer, wherein the second layer is configured to extract reduced-dimension dynamic latent variables (DLVs) from the linearized sample data using a reduced-dimension model; and a third layer, wherein the third layer is configured to parameterize the extracted reduced-dimension DLVs using a latent state space model; and input data from the nonlinear dynamic process into the trained model for monitoring the nonlinear dynamic process.

11. The computing system of claim 10, wherein linearizing the sample data comprises nonlinearly mapping the sample data into a high-dimensional feature space.

12. The computing system of claim 10, wherein the one or more dimension lifting techniques comprises one or more kernel methods.

13. The computing system of claim 10, wherein the reduced-dimension model comprises a weight matrix.

14. The computing system of claim 10, wherein the latent state space model comprises system matrices.

15. The computing system of claim 14, wherein the system matrices comprise a latent state transition matrix, an emission matrix and a Kalman gain matrix.

16. The computing system of claim 10, wherein:

the reduced-dimension model comprises a weight matrix;

the latent state space model comprises system matrices; and the programming instructions further instruct the at least one processor to update the weight matrix and the system matrices using an alternating optimization algorithm.

17. The computing system of claim 10, wherein the first layer is further configured to compute reconstruction residuals, and wherein the second layer and the third layer are further configured to compute DLVs prediction residuals.

18. The computing system of claim 10, wherein the model further comprises a fault label matrix configured to identify a fault condition in the nonlinear dynamic process.

\* \* \* \* \*